(12) United States Patent
Coussieu et al.

(10) Patent No.: US 8,316,242 B2
(45) Date of Patent: Nov. 20, 2012

(54) CRYPTOPROCESSOR WITH IMPROVED DATA PROTECTION

(75) Inventors: Alain Coussieu, Flaviac (FR); Alain Eck, Montmeyran (FR)

(73) Assignee: Ingenico France, Neuilly sur Seine (FR)

( * ) Notice: Subject to any disclaimer, the term of this patent is extended or adjusted under 35 U.S.C. 154(b) by 305 days.

(21) Appl. No.: 12/600,747

(22) PCT Filed: May 19, 2008

(86) PCT No.: PCT/FR2008/050860
§ 371 (c)(1),
(2), (4) Date: Jan. 20, 2010

(87) PCT Pub. No.: WO2008/142356
PCT Pub. Date: Nov. 27, 2008

(65) Prior Publication Data
US 2010/0169671 A1    Jul. 1, 2010

(30) Foreign Application Priority Data

May 21, 2007  (FR) ..................................... 07 55148

(51) Int. Cl.
*G06F 21/00* (2006.01)
(52) U.S. Cl. ........................................ 713/189; 713/194
(58) Field of Classification Search .......... 713/189–194, 713/300, 340
See application file for complete search history.

(56) References Cited

U.S. PATENT DOCUMENTS

| 5,457,748 | A | 10/1995 | Bergum |
| 7,218,567 | B1 * | 5/2007 | Trimberger et al. .......... 365/228 |
| 2002/0062473 | A1 * | 5/2002 | Tomioka ........................... 716/4 |
| 2003/0123348 | A1 * | 7/2003 | Ozaki ........................ 369/47.14 |

FOREIGN PATENT DOCUMENTS

| EP | 0417447 A | 3/1991 |
| GB | 2195478 A | 4/1988 |
| WO | 99/40501 A | 8/1999 |

OTHER PUBLICATIONS

Search Report issued in PCT/FR2008/050860 on Feb. 3, 2009.
Written opinion issued in PCT/FR2008/050860.

* cited by examiner

*Primary Examiner* — Edward Zee
*Assistant Examiner* — Chi Nguy
(74) *Attorney, Agent, or Firm* — Vedder Price PC

(57) ABSTRACT

The invention relates to an electronic circuit comprising: a first random-access data storage element, a processing module designed to delete the first storage element, and an access terminal which is connected to the processing module and receives a first power signal supplied by a first power source external to the electronic circuit. The circuit also includes a second random-access storage element in which a key is stored, said key being used to encrypt the data and a second power source which is built into the electronic circuit and supplies a second power signal to the processing module. The processing module is designed to detect an unauthorized access attempt by comparing the first and second power signals and to delete the key when the processing module is powered by the second power source.

8 Claims, 1 Drawing Sheet

CRYPTOPROCESSOR WITH IMPROVED DATA PROTECTION

FIELD OF THE INVENTION

The present invention applies to an electronic circuit comprising a RAM in which data are stored, capable of deleting the data on detection of an unauthorized access attempt.

DISCUSSION OF PRIOR ART

Many electronic systems comprise a RAM in which critical data necessary to the proper operation of the electronic system and which must not be accessible to an unauthorized user, are stored. As an example, a card reader, for example, a bank card reader, generally comprises an electronic circuit, called cryptoprocessor, dedicated to the storage of critical data and to the performing of arithmetical operations on the critical data. The critical data for example correspond to the personal identification numbers of the cards introduced into the reader or to keys used by the cryptoprocessor to implement encryption algorithms. The cryptoprocessor is capable of deleting all the critical data as soon as an attempt of unauthorized access to the reader is detected by security devices equipping the reader to prevent an individual from reading to the critical data stored in the cryptoprocessor.

The reader components, among which the cryptoprocessor, are generally powered from a single power source, for example, the mains power supply, called main power supply hereafter. A backup power supply source is generally provided at the level of the reader to power the cryptoprocessor even when the main power supply is interrupted so as to enable the data retention, the operation of the security devices and the deleting of the critical data in case an unauthorized access attempt is detected. The backup power supply source is for example formed of a cell connected to the cryptoprocessor and providing a backup power supply voltage.

Due, in particular, to the structure and to the size of the backup power supply and to current security requirements in the field of bank card readers, the protection of the backup power supply source requires expensive mechanical devices (for example, a cover with an opening detector) and it is generally not possible to fully exclude the risk for an individual to be able to access the backup power supply source without for this intrusion to be detected by the cryptoprocessor. According to a first possibility, it could be envisaged to deactivate the backup power supply source, which would result in a stopping of the cryptoprocessor operation without for the critical data stored in the cryptoprocessor RAM to have been deleted. Although an interruption of the power supply of a RAM theoretically causes the loss of the data stored therein, there is a risk for the data to be recoverable due to persistence phenomena specific to certain types of conventional RAMS used in readers. According to a still less favorable assumption, one could envisage, by varying the backup power supply voltage, to disturb the cryptoprocessor operation so that an access to the cryptoprocessor becomes possible without causing a deleting of the critical data in the RAM, which then remains powered. The critical data might then be read by an unauthorized person.

Document GB2195478 describes an electronic circuit comprising a main memory, a secondary memory, and an intrusion detector. The secondary memory is deleted on detection of an intrusion. The electronic system is powered by an external power supply source.

Document WO 99/40501 describes an electronic system comprising a single memory connected to a main power supply source and an intrusion detector. The secondary memory is connected to another power supply source on detection of an intrusion to be deleted.

SUMMARY OF THE INVENTION

The present invention aims at an electronic circuit comprising a RAM in which critical data are stored, which is capable of preventing the access to the critical data in case of a variation of the electronic circuit power supply voltage.

Thus, an embodiment of the present invention provides an electronic circuit made in integrated form, comprising a first data storage RAM; a processing unit capable of performing a deleting operation in the first RAM; and an access terminal connected to the processing unit and intended to receive a first power supply signal provided by a first power supply source external to the electronic circuit. The circuit further comprises a second RAM in which is stored a key, said data being encrypted by implementation of said key; and a second power supply source integrated to the electronic circuit and capable of providing a second power supply signal to the processing unit, the processing unit being capable of detecting that an unauthorized access attempt is occurring based on the comparison of the first and second power supply signals and of deleting said key while the processing unit is powered by the second power supply source.

According to an embodiment, the second power supply source comprises a capacitive element connected to the access terminal and to the processing unit, the electronic circuit further comprising a device capable of preventing a fast discharge of the capacitive element by an external action on the access terminal.

According to an embodiment, the processing unit comprises MOS transistors and the capacitive element corresponds to the stray capacitances of the MOS transistors.

According to an embodiment, the storage capacity of the second RAM is smaller than the storage capacity of the first RAM.

According to an embodiment, the storage capacity of the second RAM is smaller than one thousand bits.

According to an embodiment, the circuit comprises an additional access terminal intended to be connected to a third power supply source, external to the electronic circuit, ensuring the power supply of the processing unit in a normal operating mode of the electronic circuit, the first power supply source ensuring the power supply of the processing unit when the third power supply source is inactive.

According to an embodiment, the first power supply source comprises a cell connected to the access terminal and a capacitor assembled in parallel across the cell.

The present invention also provides a system, especially a card reader, comprising a package containing a power supply source and an electronic circuit such as previously defined connected to the power supply source.

The present invention also provides a method for protecting data stored in a first RAM of an electronic circuit, the electronic circuit further comprising a processing unit capable of deleting the first RAM and an access terminal connected to the processing unit and intended to receive a first power supply terminal provided by a first power supply source external to the electronic circuit. The method comprises providing a second RAM at the level of the electronic circuit in which a key is stored, said data being obtained by an encryption implementing said key and a second power supply source integrated to the electronic circuit and capable of providing a second power supply signal to the processing unit. The method further comprises having the processing unit detect that an unauthorized access attempt is occurring based on the comparison of the first and second power supply signals and delete said key, the processing unit being then powered by the second power supply source.

According to an embodiment, the first power supply signal corresponds to a first voltage and the second power supply signal corresponds to a second voltage, an unauthorized access attempt being detected when the difference between the second and first voltages is greater than a given threshold for a given time period.

BRIEF DESCRIPTION OF THE DRAWINGS

The foregoing objects, features, and advantages of the present invention, as well as others, will be discussed in detail in the following non-limiting description of specific embodiments in connection with the accompanying drawings, among which.

DETAILED DESCRIPTION

Figure 1:
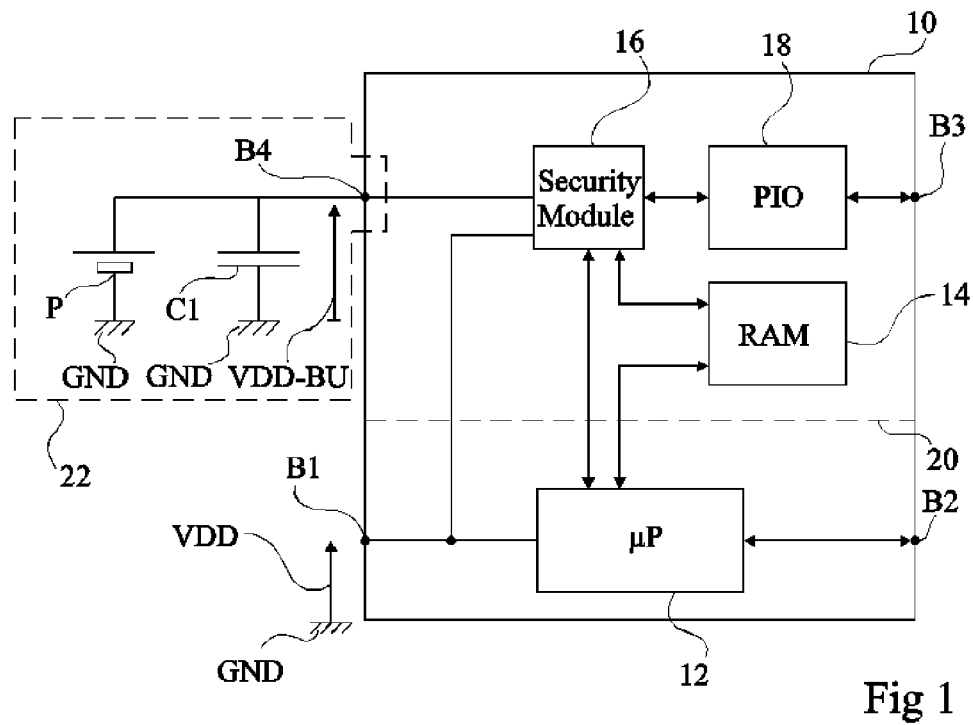
FIG. 1 shows a conventional example of a card reader cryptoprocessor.

For clarity, the same elements have been designated with the same reference numerals in the different drawings.

A conventional example of a cryptoprocessor will now be described in relation with FIG. 1. As an example, a cryptoprocessor equipping a card reader, for example, a bank card reader, is considered. However, the present invention may apply to any type of cryptoprocessor.

Cryptoprocessor 10 corresponds to an integrated circuit comprising a power supply terminal B1 to which is applied a main power supply voltage VDD provided, for example, based on the mains power supply. As an example, main power supply voltage VDD is on the order of 2 volts. Cryptoprocessor 10 comprises a microprocessor 12 (μP) which performs, in normal operation, the conventional operations specific to cryptoprocessor 10. For this purpose, cryptoprocessor 10 comprises one or several access terminals (a single terminal B2 being shown in FIG. 1) via which microprocessor 12 exchanges data with other components of the reader. Cryptoprocessor 10 further comprises a RAM 14 from and into which microprocessor 12 is capable of reading and writing data, especially so-called critical data. The size of memory 14 depends on the amount of data processed by cryptoprocessor 10 and is, conventionally, on the order of a few kilobytes, for example, 8 kilobytes.

Cryptoprocessor 10 further comprises a security module or automaton 16. Security module 16 is a logic circuit which has a simpler structure than microprocessor 12 and which may comprise from a few thousands to a few tens of thousands of logic gates. Security module 16 may exchange data with microprocessor 12 and at least perform write operations into memory 14. Security module 16 may further exchange data with other components of the reader via access terminals (a single terminal B3 being shown in FIG. 1). An input/output interface module 18 (PIO) is generally provided between security module 16 and access terminal B3. As an example, security module 16 may receive through access terminal B3 signals transmitted by security devices equipping the reader. An example of a security device corresponds to a circuit of lattice type comprising a conductive track having its interruption, representative of an unauthorized attempt to access the reader, cause the delivery of an alarm signal to cryptoprocessor 10. Another example of a security device corresponds to a dummy keyboard key permanently ensuring an electric contact between two conductive tracks in normal operation, an interruption of the contact being representative of an unauthorized access attempt and causing the delivery of an alarm signal to cryptoprocessor 10. Another security device corresponds to a temperature sensor, an excessive temperature being representative of a malfunction or of an unauthorized access attempt and causing the delivery of an alarm signal to cryptoprocessor 10. Security module 16 may decide that an unauthorized access attempt is occurring on reception of an alarm signal at terminal B3, on detection of a variation of main power supply voltage VDD, on detection of a malfunction of microprocessor 12, etc. When security module 16 detects an unauthorized access attempt, it controls the deleting of the data stored in memory 14. Cryptoprocessor 10 comprises a module, not shown, for providing a clock signal which rates the elements of cryptoprocessor 10, especially security module 16.

In normal operation, security module 16 is powered by main supply voltage VDD. When main supply voltage VDD is not present, security module 16 is powered by a backup power supply source providing a backup supply voltage VDD_BU to a terminal B4 of cryptoprocessor 10. In the present embodiment, the backup power supply source comprises a cell P having a terminal connected to terminal B4 and having its other terminal connected to a source of a reference voltage, for example, ground GND of the reader. Further, a capacitor C1 is assembled in parallel across cell P. The elements of cryptoprocessor 10 which do not operate when main supply voltage VDD is not present have been placed under a dotted line 20 and the elements of cryptoprocessor 10 which, when main supply voltage VDD is not present, keep on operating by being powered by backup supply voltage VDD_BU, possibly in an operating mode different from the normal operating mode, have been placed above line 20. In particular, the module for providing the clock signal operates permanently. When main power supply voltage VDD is not present, security module 16, powered by cell P, keeps on operating and can thus delete the data stored in memory 14 when an unauthorized access attempt is detected. In the case where cell P would be deactivated, security module 16 remains powered for some time by capacitor C1. The decrease in the voltage across capacitor C1 is detected by security module 16 which reacts, as for the detection of an unauthorized access attempt, by deleting the critical data stored in memory 14. The capacitance of capacitor C1, which generally corresponds to a discrete component, is sufficient to enable security module 16 to perform the deleting operation in memory 14.

The reader generally comprises a package formed of an upper package portion (at the level of which are located the display screen and the reader keyboard) and of a lower package portion. The package contains a motherboard, the electronic components of the reader being connected to one or the other of the motherboard surfaces. In particular, cryptoprocessor 10 and capacitor C1 are generally connected on the motherboard surface oriented towards the upper package portion or upper surface. For bulk reasons, cell P is generally connected to the motherboard surface oriented towards the lower package portion or lower surface. Even if security devices may be provided on the two surfaces of the motherboard, it is generally considered that the security level of the components connected to the lower surface of the motherboard is lower than that of the components connected to the upper surface of the motherboard since an intrusion carried out on the side of the upper package portion is generally visible in a usual handling of the package.

There thus is a risk for an individual to be able to access cell P without for an unauthorized access attempt to be detected. It would then theoretically be possible to modify the value of backup supply voltage VDD_BU while main supply voltage VDD is not present. This could disturb the operation of security module 16 which would then no longer be able to detect an unauthorized access attempt and to accordingly delete the critical data stored in memory 14. An access to these data would then be possible.

Further, although capacitor C1 is generally arranged on the upper motherboard surface, which has a greater security level than the lower surface, it is a discrete component separate from cryptoprocessor 10. There thus always is a risk for a user to be able to access capacitor C1 without for an unauthorized access attempt to be detected. A disconnection of capacitor C1 and of cell P then causes the almost immediate drop of backup supply voltage VDD_BU and thus, when main supply voltage VDD is not present, a stopping of the operation of security module 16 without for an operation of deleting the critical data stored in memory 14 to have been performed. Although the interruption of the power supply of RAM 14 theoretically causes a loss of the data stored therein, there is a risk, due to persistence phenomena in certain types of RAMs, for critical data, or part of these, to be recovered. Dotted lines 22 delimit the elements of reader 10, more specifically cell P, capacitor C1, and the electric connection between cell P, capacitor C1, and access terminal B4, which require a specific protection to ensure the proper operation of cryptoprocessor 10.

Figure 2:
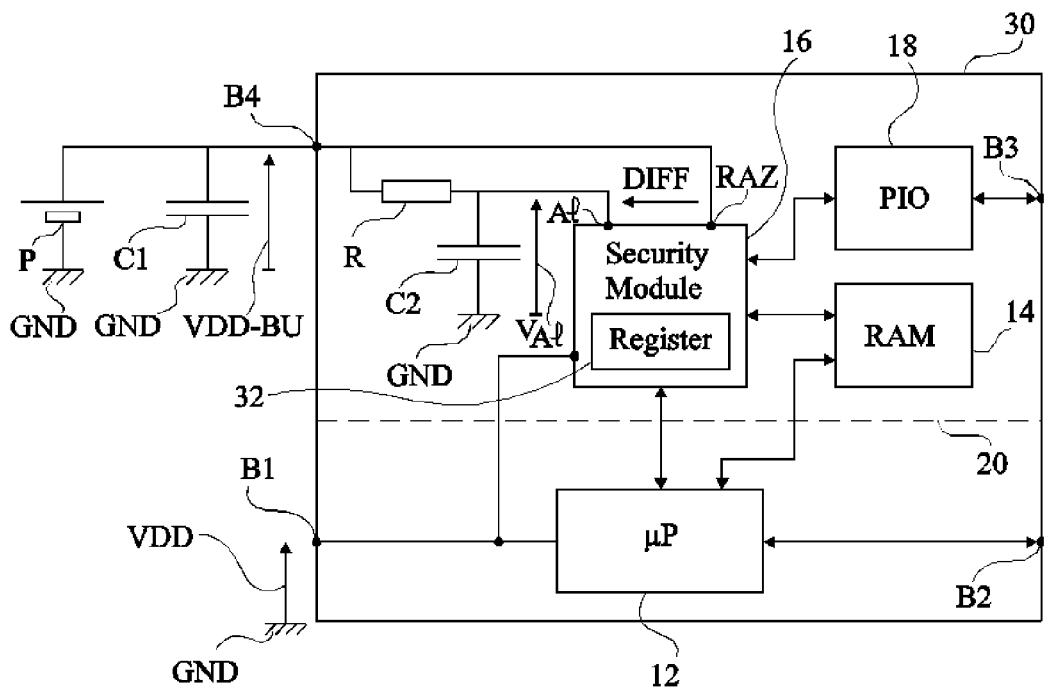
FIG. 2 shows an embodiment of a card reader cryptoprocessor according to the present invention.

FIG. 2 shows an embodiment of a cryptoprocessor 30 according to the present invention which enables to prevent the access to critical data during variations of backup supply voltage VDD_BU. The elements common with cryptoprocessor 10 of FIG. 1 are designated with the same reference numerals. Cryptoprocessor 30 comprises all the elements of cryptoprocessor 10 and further comprises an additional capacitor C2 having a terminal connected to a source of a reference voltage, for example, ground GND of the reader, and having its other terminal connected on the one hand to a terminal A1 of security module 16 and on the other hand to terminal B4 via a device R (for example, a resistor, a diode or other) forbidding a fast discharge of capacitor C2 by an external action on terminal B4. Terminal B4 is further directly connected to a terminal RAZ of security module 16. Call DIFF the voltage between terminals A1 and RAZ, and $V_{A1}$ the voltage across capacitor C2. Security module 16 comprises an additional RAM 32 (Register) of decreased capacity with respect to RAM 14 and for which the read and write operations may be carried out by processing unit 16 over a small number of clock cycles and at a low power cost. It for example is a register of a few hundreds of bits, for example, 256 bits.

In the present embodiment, the critical data are stored in memory 14 in encrypted form, the used encrypted method implementing at least one key, called primary key. The primary key is stored in additional memory 32 of security module 16. In normal operation, when microprocessor 12 desires to use critical data stored in memory 14, it also reads the primary key stored in additional memory 32 to decrypt the critical data stored in memory 14. On detection of an unauthorized access attempt, security module 16 first deletes the primary key stored in additional memory 32 then may delete the critical data stored in memory 14.

In case of an interruption of main supply VDD, microprocessor 12 stops operating and security module 16 keeps on operating by being powered by cell P. Capacitor C2 is charged by backup supply voltage VDD_BU applied to terminal B4. Voltage $V_{A1}$ is also equal to backup supply voltage VDD_BU. Voltage DIFF is then substantially zero. In the case where backup supply voltage VDD_BU varies, which for example corresponds to a deactivation of cell P or to an intentional manipulation of voltage VDD_BU, the voltage at terminal RAZ varies while voltage VA1 at terminal A1 is maintained at a substantially constant value by capacitor C2. The increase in absolute value of voltage DIFF is detected by security module 16 as an unauthorized access attempt, for example when it is greater than a determined threshold for a given number of clock cycles. Since backup supply voltage VDD_BU may have decreased, security module 16 is then powered by additional capacitor C2 until it is discharged. An unauthorized access attempt having been detected, security module 16 first deletes the primary key stored in secondary memory 32. Then, if its power supply is sufficient, security module 16 attempts to delete the critical data stored in memory 14.

The size of additional memory 32 being small, the operation of deleting the data stored in additional memory 32 may be carried out rapidly with a low energy cost. In particular, it may be performed while security module 16 is only being powered by capacitor C2. However, according to the size of RAM 14, the capacitance of capacitor C2 may be insufficient to ensure a sufficient power supply of security module 16 enabling to delete all the critical data stored in memory 14. But even if the power supply of security module 16 by capacitor C2 is insufficient to enable the deleting of all the critical data stored in memory 14 and even if backup supply voltage VDD_BU is taken to a value for which the operation of security module 16 is disturbed so that it is then no longer able to delete the remaining critical data stored in memory 14, the remaining critical data stored in memory 14 are no longer usable since the primary key stored in additional memory 32 has been deleted. The critical data remaining in memory 14 are then no longer accessible.

As an example, the capacitance of capacitor C2 may be smaller than a few picofarads. Such a capacitance is sufficient to ensure a power supply current of security module 16 on the order of a few hundreds of nanoamperes for a few clock cycles. This is sufficient to ensure the operation of security module 16 for the few clock cycles necessary to detect an intrusion attempt and to delete additional memory 32. In particular, when additional memory 32 corresponds to a register, the deleting of the data stored in memory 32 may be performed in a single clock cycle. Capacitor C2 may be integrated with the other elements of security module 16. As an example, capacitor C2 may correspond to the stray capacitances of MOS transistors forming security module 16. Further, since capacitor C2 powers security module 16, the constraints of protection of cell P, of capacitor C1, and of the electric connection between cell P, capacitor C1, and access terminal B4 may be less strict than for the circuit shown in FIG. 1.

Specific embodiments of the present invention have been described. Various alterations and modifications will occur to those skilled in the art. In particular, although the present invention has been described in the case of a cryptoprocessor connected to a main power supply source and to a backup supply source, it should be clear that it may apply to a cryptoprocessor connected to a single supply source, the additional capacitor integrated to the cryptoprocessor being then charged by the single power supply source, and the voltage provided by the single power supply source being compared with the voltage across the additional capacitor by the security module for the detection of an unauthorized access attempt.

The invention claimed is:

1. An electronic circuit made in integrated form, comprising:
   a first data storage RAM;
   a second RAM in which a key is stored, said data being encrypted by implementation of said key;
   a processing unit configured to perform a deleting operation in the first RAM;
   an access terminal connected to the processing unit and receiving a first power supply signal provided by a first power supply source external to the electronic circuit; and
   a second power supply source integrated to the electronic circuit and configured to provide a second power supply signal to the processing unit, the processing unit being configured to detect that an unauthorized access attempt is occurring based on comparison of the first and second power supply signals and to delete said key while the processing unit is powered by the second power supply source,
   wherein the processing unit comprises MOS transistors, wherein the second power supply source corresponds to stray capacitances of the MOS transistors, and wherein the storage capacity of the second RAM is smaller than the storage capacity of the first RAM.

2. The electronic circuit of claim 1, wherein the second power supply source comprises a capacitive element connected to the access terminal and to the processing unit, the electronic circuit further comprising a device configured to prevent a fast discharge of the capacitive element by an external action on the access terminal.

3. The electronic circuit of claim 1, wherein the storage capacity of the second RAM is smaller than one thousand bits.

4. The electronic circuit of claim 1, comprising an additional access terminal intended to be connected to a third power supply source, external to the electronic circuit, ensuring the power supply of the processing unit in a normal operating mode of the electronic circuit, the first power supply source ensuring the power supply of the processing unit when the third power supply source is inactive.

5. The electronic circuit of claim 1, wherein the first power supply source comprises a cell connected to the access terminal and a capacitor assembled in parallel across the cell.

6. A system, comprising a package including the first power supply source and the electronic circuit of claim 1 connected to the first power supply source via the access terminal of the electronic circuit.

7. A method for protecting data, the method comprising:
   storing said data in a first RAM of an electronic circuit;
   storing a key in a second RAM of the electronic circuit, wherein said data being obtained by an encryption implementing said key;
   performing, by a processing unit of the electronic circuit, a delete operation in the first RAM;
   receiving, by an access terminal connected to a the processing unit, a first power supply signal delivered by a first power supply source, external to the electronic circuit;
   providing a second power supply signal to the processing unit; and
   detecting, by the processing unit, that an unauthorized access attempt is occurring based on comparison of the first and second power supply signals; and
   deleting said key, the processing unit being then powered by the second power supply source,
   wherein the processing unit comprises MOS transistors and the second power supply signal corresponds to stray capacitances of the MOS transistors, and wherein storage capacity of the second RAM is smaller than storage capacity of the first RAM.

8. The method of claim 7, wherein the first power supply signal corresponds to a first voltage and wherein the second power supply signal corresponds to a second voltage, an unauthorized access attempt being detected when the difference between the second and first voltages is greater than a given threshold for a given time period.

* * * * *